INVENTORS
F.W. KARASEK
R.J. LOYD
BY Hudson & Young
ATTORNEYS

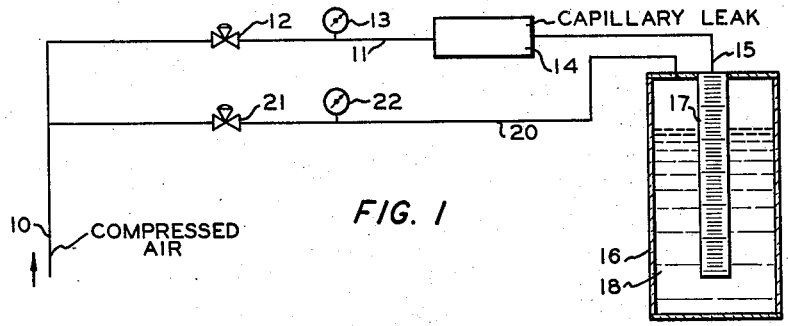
FIG. 1
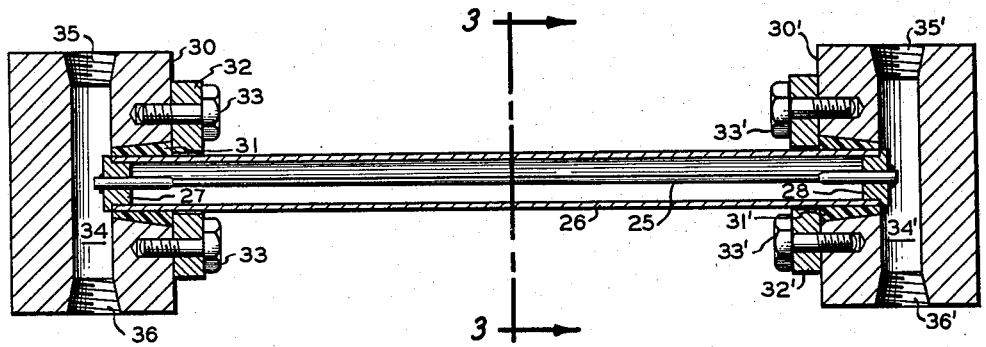
FIG. 2
FIG. 3
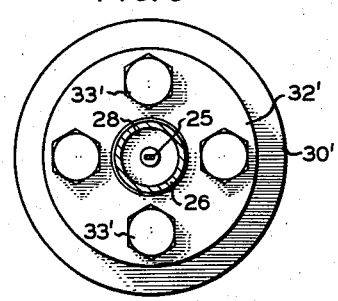
FIG. 4
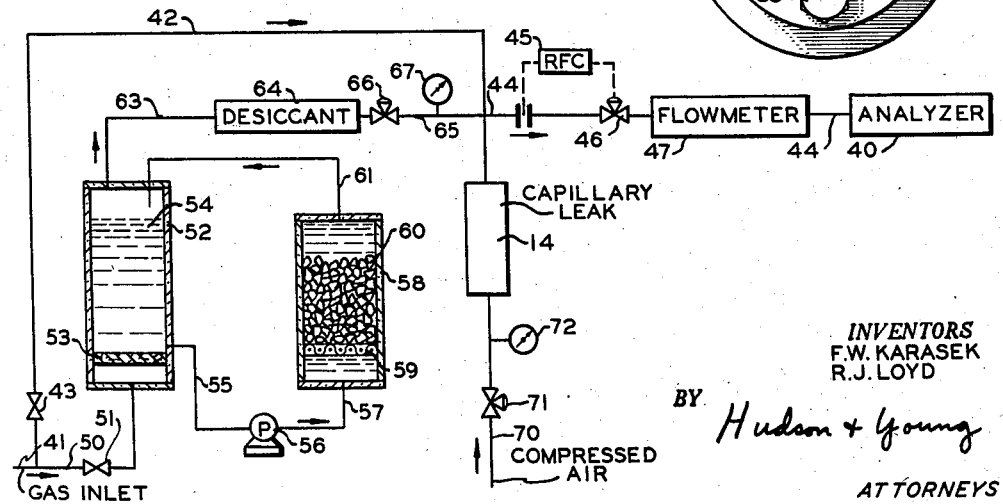
INVENTORS
F.W. KARASEK
R.J. LOYD
BY Hudson + Young
ATTORNEYS March 24, 1959  F. W. KARASEK ET AL  2,879,140
FLUID BLENDING Filed March 18, 1955  2 Sheets-Sheet 2

United States Patent Office 2,879,140
Patented Mar. 24, 1959

2,879,140

FLUID BLENDING

Francis W. Karasek, Bartlesville, Okla., and Robert J. Loyd, Tooele, Utah, assignors to Phillips Petroleum Company, a corporation of Delaware Application March 18, 1955, Serial No. 495,267

5 Claims. (Cl. 23—232)

This invention relates to a method of and apparatus for blending fluids of predetermined composition. In another aspect it relates to a method of and apparatus for calibrating conduits for fluid flow at preselected pressure differentials.

Various types of analytical instruments are known which are capable of analyzing fluid streams to determine the concentration of a particular constituent therein. Such instruments include photometric analyzers, mass spectrometers and differential refractometers, for example. In order to calibrate these instruments it is common practice to pass a fluid stream of known composition to the analyzer. The blending of such a fluid stream presents considerable difficulty when it is necessary to have a gas stream containing a given constituent in concentrations as low as several parts per million. Such a problem has recently been encountered in attempting to calibrate a photometric analyzer which is designed to determine the concentration of oxygen in hydrocarbon streams from zero to approximately 100 parts of oxygen per million parts of hydrocarbon.

The present invention provides a method of and apparatus for establishing fluid streams containing known concentrations of a selected constituent. This constituent is first directed through a restricted conduit having a known pressure differential thereacross and the flow rate is measured. The procedure can be repeated with a plurality of selected pressure differentials to obtain a calibration curve of the conduit. A carrier fluid is then passed into the analyzer or other fluid receiver at a known rate. The selected constituent is added to the carrier fluid by passage through the previously calibrated conduit. The flow through the conduit, and thus the rate of addition to the carrier fluid, is selected by adjusting the pressure differential across the conduit. The blended fluid stream can be employed to advantage to calibrate a photometric analyzer.

Accordingly, it is an object of this invention to provide a method of blending fluid streams of known composition.

Another object is to provide apparatus for controlling the rate of addition of a first fluid to a second fluid.

A further object is to provide a method of and apparatus for calibrating analytic instruments adapted to analyze fluid streams.

A further object is to provide an improved fluid analysis system.

Other objects, advantages and features of the invention should become apparent from the following detailed description taken in conjunction with the accompanying drawing in which:

Figure 1 is a schematic representation of the restricted conduit calibrating apparatus;

Figure 2 is a sectional view of the capillary leak which forms the restricted conduit of Figure 1;

Figure 3 is a view taken along line 3—3 in Figure 2;

Figure 4 is a schematic representation of apparatus employed to blend a fluid stream of predetermined composition;

Figure 5:
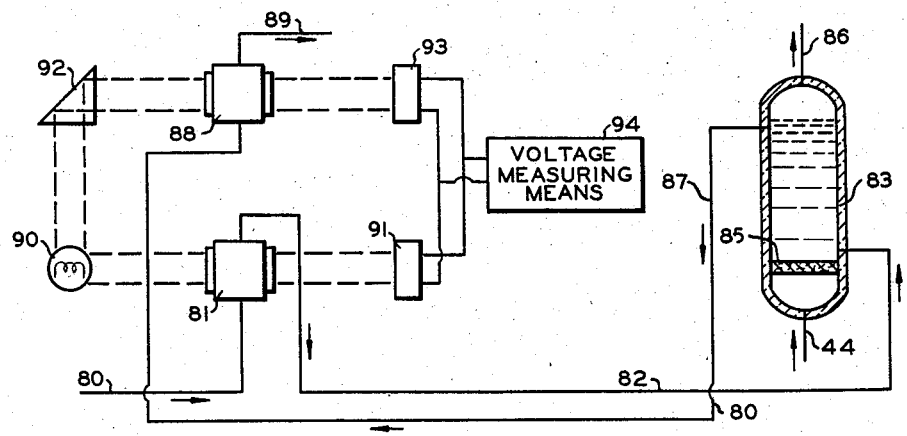
Figure 5 is a schematic representation of an analyzer adapted to determine the composition of the blended fluid stream of Figure 4.

For purposes of illustrating the principles of this invention reference will be made to a system for establishing a fluid stream having a predetermined amount of oxygen therein. As discussed hereinafter, the invention obviously is not limited to this particular blending operation.

Referring now to the drawing in detail, and to Figure 1 in particular, there is shown a conduit 10 which supplies compressed air from a source, not shown, to the calibrating apparatus. A branch conduit 11 communicates at one end with conduit 10. Conduit 11 has a pressure regulator 12 and a pressure gauge 13 therein. The second end of conduit 11 communicates with the inlet of a capillary leak 14. The outlet of capillary leak 14 is connected by a conduit 15 to the first inlet of a liquid container 16. Container 16 is formed of a transparent material and has a graduated tube 17 depending from the top thereof. Conduit 15 communicates with the interior of graduated tube 17. Container 16 is partially filled with a liquid 18 which does not absorb an appreciable amount of oxygen and which does not react with oxygen. A suitable liquid for this purpose is a saturated aqueous solution of sodium chloride. A second branch conduit 20 communicates between conduit 10 and the interior of container 16 above liquid 18. Conduit 20 has a pressure regulator 21 and a pressure gauge 22 therein.

When it is desired to blend a fluid stream containing extremely small concentrations of a particular constituent, capillary leak 14 can advantageously be of the form illustrated in Figures 2 and 3. The leak itself is defined by a hollow tube 25 which has a small cross-sectional area. The center portion of tube 25 is flattened to further diminish the cross-sectional area thereof. This forms a conduit which permits only a small passage of fluid therethrough. Tube 25 is positioned within a support tube 26. Plugs 27 and 28 enclose the respective ends of tube 25 and are in turn mounted within the respective ends of tube 26. Plugs 27 and 28 are secured to tubes 25 and 26, as by soldering, to form a fluid-tight seal. The ends of tube 25 preferably protrude slightly beyond plugs 27 and 28. The end of tube 26 adjacent plug 27 terminates in a passage 34 in a first end plate 30. An annular wedge-shaped sealing gasket 31 is positioned between tube 26 and plate 30, and a flange 32 is secured to plate 30 by a plurality of screws 33 to force gasket 31 into engagement with plate 30 and tube 26. The ends of passage 34 terminate in resective ports 35 and 36. The second end of tube 26 is inserted through an opening in a second end plate 30'. The elements securing the second end of tube 26 to plate 30' are similar to the corresponding elements securing the first end of the tube to plate 30 and are designated by like primed reference numerals. Plate 30' has a passage 34' therethrough which terminates in respective ports 35' and 36'.

In operation of the calibrating apparatus of Figure 1, pressure regulator 21 is adjusted to maintain a selected pressure above the surface of liquid 18 in container 16. This pressure can be of the order of 10 pounds per square inch gauge, for example. Pressure regulator 12 is adjusted to provide a pressure greater than the pressure established by regulator 21. This pressure can be of the order of 20 pounds per square inch gauge, for example. Conduit 11 communicates with inlet port 35 of leak 14. Port 36 is plugged to direct the flow of air through tube 25. Port 36' in plate 30' is also plugged and port 35' is connected to conduit 15. This results in a pressure differential being established across leak 14 which passes air from conduit 11 through leak 14 and conduit 15 to the interior of tube 17. This flow of air displaces liquid 18 downwardly through tube 17. The liquid displaced in a given time interval represents the volume of gas passed through leak 14. This procedure can be repeated with a plurality of different pressure differentials between gauges 13 and 22 to determine the flow rates through leak 14 at these various pressure differentials. The flow rate and pressure differentials can be plotted as a graph which shows the relationship between the gas flow through leak 14 at selected pressure differentials. Leak 14 is then calibrated and is ready for use in blending fluid streams.

Apparatus for establishing a gas stream having a predetermined oxygen content is illustrated in Figure 4 of the drawing. An analyzer 40 is provided to measure the oxygen content in a gas sample which is supplied by an inlet conduit 41. A branch conduit 42, having a valve 43 therein, communicates between conduit 41 and a conduit 44. Conduit 44 has a rate-of-flow controller 45 associated therewith which regulates a valve 46 to maintain a predetermined flow. A flowmeter 47 is also associated with conduit 44. The outlet of flowmeter 47 is connected to the inlet of analyzer 40. In normal operation, valve 43 is open so that the gas sample is passed directly to analyzer 40. When it is desired to calibrate the analyzer with a fluid stream having a known amount of oxygen therein, valve 43 is closed to interrupt the flow of gas from conduit 41 directly to the analyzer.

A conduit 50, having a valve 51 therein, communicates between conduit 41 and the first inlet of an oxygen scrubbing chamber 52. Chamber 52 has a filter 53 in the lower portion thereof which permits the flow of gas therethrough but blocks liquid flow. Chamber 52 contains a suitable oxygen removing agent, such as a reduced alkaline aqueous solution of sodium anthraquinone-beta-sulfonate. A portion of this solution is continuously removed from chamber 52 through a conduit 55 which communicates with the inlet of a pump 56. The outlet of pump 56 is connected by a conduit 57 to the inlet of a regeneration chamber 58. A screen 59 is disposed in the lower portion of chamber 58 to support a mass of zinc amalgam. Solution 54 is circulated through the amalgam and is returned to chamber 52 through a conduit 61. The solution is thus continuously circulated through the amalgam so that the solution supplied to chamber 52 is in the reduced state. The solution is oxidized by the oxygen present in the gas sample so that the gas removed from chamber 52 through a conduit 63 is oxygen-free. Conduit 63 communicates with the inlet of a chamber 64 which is filled with a desiccant, such as silica gel, for example. The outlet of chamber 64 is connected to conduit 44 by a conduit 65 which has a pressure regulator 66 and a pressure gauge 67 therein.

When valve 51 is opened, the gas sample passes through chamber 52 and chamber 64 so that the gas directed through conduit 65 is free of oxygen and water vapor. This gas is directed through conduit 44 and flowmeter 47 to analyzer 40. A preselected amount of oxygen is added to this gas so that the analyzer can be calibrated. This is accomplished by passing a known amount of air from a compressed air conduit 70 through capillary leak 14 into conduit 44. Conduit 70 has a pressure regulator 71 and a pressure gauge 72 therein. Conduit 70, pressure regulator 71 and pressure gauge 72 preferably are respective elements 10, 12 and 13 of Figure 1. Pressure regulators 71 and 66 are adjusted so that a preselected pressure differential is maintained across leak 14. Thus, the flow of air through leak 14 is known from the previous calibration of the leak. In this manner a known volume of air is added to the oxygen-free sample gas to form a stream of known composition which is employed to calibrate the analyzer.

A preferred form of analyzer 40 is illustrated schematically in Figure 5. This analyzer is based upon the principle that certain reagents undergo a color change when contacted with oxygen. A reagent which can be used to advantage for this purpose is an alkaline aqueous solution sodium anthraquinone-beta-sulfonate. The reduced solution of this reagent is bright red in color whereas the oxidized solution is lighter red, depending upon the degree of oxidation. A reduced sulfonate solution is directed through a conduit 80 which communicates with the inlet of a reference cell 81. The outlet of cell 81 is connected by a conduit 82 to the liquid inlet of a vapor-liquid contacting chamber 83. Conduit 44 of Figure 4 communicates with the gas inlet in chamber 83. A gas permeable filter 85 is contained in the lower portion of chamber 83 to allow the gas to pass upwardly through the chamber to contact with the reduced sulfonate solution. The gas is removed from chamber 83 through a conduit 86. The partially oxidized sulfonate solution is removed through a conduit 87 which communicates with the inlet of a sample cell 88. The sulfonate solution is partially oxidized by the oxygen present in the gas stream circulated through chamber 83. This changes the color of the solution which is passed through cell 88. A vent conduit 89 communicates with the outlet of cell 88. If desired, the sulfonate solution removed from cell 88 can be regenerated and redirected to the inlet of cell 81. This regeneration can be accomplished by a zinc amalgam in the manner illustrated in Figure 4.

A light source 90 provides two beams of radiation. The first of these beams is directed through cell 81 to impinge upon a first photocell 91. The second beam is directed by a reflecting prism 92 through cell 88 to impinge upon a second photocell 93. The output terminals of cells 91 and 93 are connected in opposition to one another to the input of a suitable voltage measuring circuit 94. In this manner a measurement is provided of the difference in radiation incident upon the two photocells. The difference in radiation striking the two cells is a function of the amount by which the sulfonate solution is changed in color by being oxidized in chamber 83. This in turn is a function of the oxygen content of the gas sample directed through chamber 83. The output signal measured by circuit 94 can be calibrated to indicate the percentage of oxygen in the sample gas by passing standard gas samples having known amounts of oxygen therein through the analyzer. This is accomplished by the apparatus illustrated in Figure 4.

Figure 6:
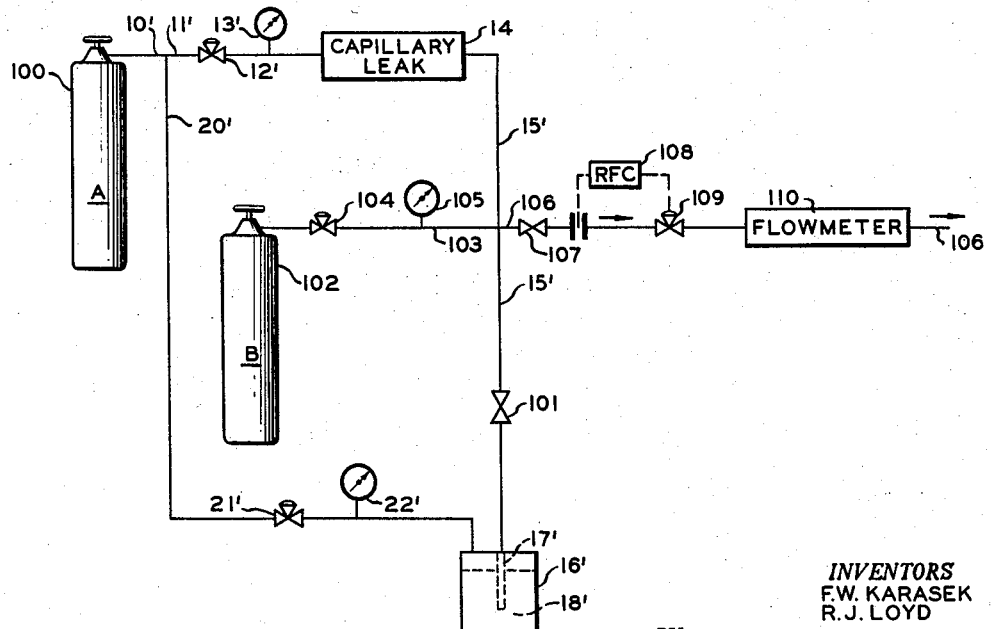
Figure 6 is a schematic representation of a second embodiment of calibrating and fluid blending apparatus.

In Figure 6 there is shown a modified form of the calibrating and fluid blending apparatus of this invention. This apparatus can be used to provide a fluid stream having a predetermined amount of a fluid A contained in a fluid B. Fluid A is supplied by a container 100 which is connected by a conduit 10' and a first branch conduit 11' to the inlet of a capillary leak 14. Conduit 11' has a pressure regulator 12' and a pressure gauge 13' therein. The outlet of leak 14 is connected by a conduit 15', which has a valve 101 therein, to the inlet of a chamber 16' which corresponds to chamber 16 of Figure 1. A branch conduit 20' communicates between conduit 10' and container 16'. Conduit 20' has a pressure regulator 21' and a pressure gauge 22' therein. Capillary leak 14 is calibrated in the manner previously described by establishing a predetermined pressure differential between gauges 13' and 22'. Valve 101 is opened at this time.

Fluid B is supplied by a container 102 which has an outlet conduit 103 communicating therewith. Conduit 103 also communicates with conduit 15' between leak 14 and valve 101. Conduit 103 has a pressure regulator 104 and a pressure gauge 105 therein. An outlet conduit 106, having a valve 107 therein, communicates at one end with conduits 15' and 103. Conduit 106 supplies the blended fluid mixture to an analyzer or other fluid container, not shown. A flowmeter 110 is associated with conduit 106. A rate-of-flow controller 108 adjusts a valve 109 in conduit 106. When it is desired to blend fluids A and B, valve 101 is closed and valve 107 is opened. Pressure regulators 12' and 104 are then adjusted to provide a predetermined pressure differential between gauges 13' and to 105. Fluid A passes through leak 14 into conduit 106 at a rate determined by this pressure differential. In this manner a preselected amount of fluid A is added to fluid B to provide a mixture of preselected composition.

While this invention has been described primarily in conjunction with providing a gaseous stream having a known amount of oxygen therein, it should be evident that the principles of this invention are not limited thereto. Obviously, any other fluid mixture can be established by the method and apparatus of this invention. While the invention has been described in conjunction with present preferred embodiments, it should be evident that the invention is not limited thereto.

What is claimed is:

1. The method of determining the rate of gas flow through a restricted passage which comprises supplying gas to one end of the passage maintaining the pressure constant at the one end, continuously flowing all of the gas in a path from the one end through a restriction in the passage to the second end of the passage, submerging the second end of the passage in a liquid, maintaining a constant second pressure on the surface of the liquid external to said second end, said second pressure being less than said first pressure, and measuring the volume of liquid displaced in said passage during a given time interval by the flow of gas through said passage.

2. Fluid blending apparatus comprising a first source of gas, a first conduit connected at one end to said first source of gas, a first pressure regulator to maintain a predetermined pressure in said first conduit adjacent said one end thereof, a container having a liquid therein, a second conduit positioned in said container so that liquid at least partially fills the interior of said second conduit, a third conduit connected between said first source of gas and the interior of said container above the surface of liquid therein, a second pressure regulator to maintain a predetermined pressure in said container, a second source of gas, a fourth conduit connected at one end to said second source of gas, a third pressure regulator to maintain a predetermined pressure in said fourth conduit adjacent said one end thereof, a fifth conduit, means connected with said fifth conduit for maintaining a predetermined fluid flow therethrough, means for connecting the second end of said first conduit selectively to said second conduit and to said fifth conduit, and means for connecting the second end of said fourth conduit to said fifth conduit.

3. Fluid blending apparatus comprising a first source of gas, a first conduit connected at one end to said first source of gas, a first pressure regulator to maintain a predetermined pressure in said first conduit adjacent said one end thereof, a container having a liquid therein, a second conduit positioned in said container so that liquid at least partially fills the interior of said second conduit, a third conduit connected between said first source of gas and the interior of said container above the surface of liquid therein, a second pressure regulator to maintain a predetermined pressure in said container, a second source of gas, a fourth conduit connected at one end to said second source of gas, a third pressure regulator to maintain a predetermined pressure in said fourth conduit adjacent said one end thereof, a fifth conduit, means connected with said fifth conduit for maintaining a predetermined fluid flow therethrough, an analyzer to determine the presence of gas from said first source, the second end of said fifth conduit being connected to the inlet of said analyzer, means for connecting the second end of said first conduit selectively to said second conduit and to the first end of said fifth conduit, and means for connecting the second end of said fourth conduit to the first end of said fifth conduit.

4. The method of determining the rate of gas flow through a passage which comprises continuously supplying gas to one end of said passage, maintaining a constant first pressure at the one end of said passage, continuously flowing said gas through a restriction in said passage, conducting all of the gas that passes through the restriction to a measuring zone immersed in liquid at the downstream terminal of the passage, maintaining a constant second pressure on the liquid surface external to the measuring zone, said second pressure being less than said first pressure, applying the pressure internal of the measuring zone to the liquid enclosed therein, and measuring the volume of liquid displaced from said zone during a given time interval by the flow of gas through the passage.

5. The method of determining gas flow through a passage which comprises supplying gas to one end of said passage, maintaining a constant first pressure at the one end, conducting all of the gases from the one end through a restriction to a second end of the passage, submerging the second end of the passage in a liquid, maintaining a constant second pressure on the surface of the liquid external to said passage, and measuring the change in the volume of liquid in the submerged second end of the passage during a given time interval.

References Cited in the file of this patent

UNITED STATES PATENTS

| | | |
|---|---|---|
| 1,487,989 | Vose | Mar. 25, 1924 |
| 1,919,858 | Pettingill | July 25, 1933 |
| 2,203,980 | Burt | June 11, 1940 |
| 2,263,335 | Heinz | Nov. 18, 1941 |
| 2,527,136 | Kagi et al. | Oct. 24, 1950 |
| 2,707,964 | Monroe | May 10, 1955 |
| 2,751,281 | Cohn | June 19, 1956 |

OTHER REFERENCES

Altieri: "Gas Analysis and Testing of Gaseous Materials," 1945, pages 47–48 (American Gas Assoc., N.Y.).